(12) United States Patent
Honda et al.

(10) Patent No.: US 10,651,448 B2
(45) Date of Patent: May 12, 2020

(54) SECONDARY CELL (71) Applicant: Envision AESC Japan Ltd., Zama-shi, Kanagawa (JP)

(72) Inventors: Takashi Honda, Kanagawa (JP); Yoshinori Naruoka, Kanagawa (JP); Satoshi Yoshino, Kanagawa (JP)

(73) Assignee: Envision AESC Japan Ltd., Zama-shi, Kanagawa (JP)

( * ) Notice: Subject to any disclaimer, the term of this patent is extended or adjusted under 35 U.S.C. 154(b) by 0 days.

(21) Appl. No.: 16/337,047

(22) PCT Filed: Sep. 28, 2017

(86) PCT No.: PCT/IB2017/001380
§ 371 (c)(1),
(2) Date: Mar. 27, 2019

(87) PCT Pub. No.: WO2018/060773
PCT Pub. Date: Apr. 5, 2018

(65) Prior Publication Data
US 2019/0221808 A1     Jul. 18, 2019

(30) Foreign Application Priority Data
Sep. 29, 2016   (JP) ................. 2016-191862

(51) Int. Cl.
*H01M 2/16* (2006.01)
*H01M 2/10* (2006.01)
(Continued)

(52) U.S. Cl.
CPC ............ *H01M 2/168* (2013.01); *H01M 4/02* (2013.01); *H01M 4/134* (2013.01); *H01M 4/386* (2013.01);
(Continued)

(58) Field of Classification Search
CPC ............ H01M 2/16; H01M 2/12; H01M 2/10; H01M 4/38; H01M 4/48; H01M 10/0525
See application file for complete search history.

(56) References Cited

U.S. PATENT DOCUMENTS

| 6,468,693 | B1* | 10/2002 | Takami | ............... | H01M 2/0275 |
|---|---|---|---|---|---|
| | | | | | 429/176 |
| 2009/0136846 | A1 | 5/2009 | Lee et al. | | |
| 2011/0129722 | A1 | 6/2011 | Yoneda | | |

FOREIGN PATENT DOCUMENTS

| CN | 1255250 A | 5/2000 |
|---|---|---|
| CN | 101447562 A | 6/2009 |

(Continued)

OTHER PUBLICATIONS

Machine Translation of: JP 2013/187021 A, Yoshida et al., Sep. 19, 2013.*

(Continued)

*Primary Examiner* — Kenneth J Douyette
(74) *Attorney, Agent, or Firm* — Young Basile Hanlon & MacFarlane, P.C.

(57) ABSTRACT

A secondary battery suppresses generation of wrinkle at the outer peripheral edge portion of a negative electrode plate due to expansion of a negative electrode active material layer with use. The secondary battery includes a positive electrode plate with a positive electrode active material layer disposed on a first current collector, and a negative electrode plate with a negative electrode active material layer having an area larger than an area of the positive electrode active material layer disposed on a second current collector. The negative electrode plate includes a facing portion facing the positive electrode active material layer and a non-facing portion. The negative electrode plate and a separator are bonded through a bonding layer. The bonding strength of a second bonding portion that bonds the non-facing portion to (Continued)

the separator is larger than the bonding strength of a first bonding portion that bonds the facing portion to the separator.

6 Claims, 4 Drawing Sheets

(51) Int. Cl.
    *H01M 4/38*     (2006.01)
    *H01M 10/0525*     (2010.01)
    *H01M 10/0585*     (2010.01)
    *H01M 10/0583*     (2010.01)
    *H01M 4/02*     (2006.01)
    *H01M 10/058*     (2010.01)
    *H01M 4/134*     (2010.01)
    *H01M 4/48*     (2010.01)

(52) U.S. Cl.
    CPC ......... *H01M 4/483* (2013.01); *H01M 10/058* (2013.01); *H01M 10/0525* (2013.01); *H01M 10/0583* (2013.01); *H01M 10/0585* (2013.01); *H01M 2004/027* (2013.01)

(56) References Cited

FOREIGN PATENT DOCUMENTS

| | | |
|---|---|---|
| EP | 0973222 A1 | 1/2000 |
| JP | 2010-176901 A | 8/2010 |
| JP | 2013187021 A | 9/2013 |
| JP | 2014-120456 A | 6/2014 |
| JP | 2014127272 A | 7/2014 |
| JP | 2018018760 A | 2/2018 |
| KR | 20140114680 A | 9/2014 |

OTHER PUBLICATIONS

Office Action of Chinese Application No. CN 201780060596.6, dated Aug. 5, 2019, with Translation; 11 pages.

\* cited by examiner

SECONDARY CELL

CROSS REFERENCE TO RELATED APPLICATION

The present application claims priority to Japanese Patent Application No. 2016-191862 filed Sep. 29, 2016, incorporated herein in its entirety.

TECHNICAL FIELD

The present invention relates to a secondary battery in which an area of a negative electrode active material layer is larger than an area of a positive electrode active material layer.

BACKGROUND

A secondary battery includes a power generating element, and the power generating element includes a positive electrode plate, in which a positive electrode active material layer is disposed on at least one surface of a first current collector, and a negative electrode plate, in which a negative electrode active material layer having an area larger than an area of the positive electrode active material layer is disposed on at least one surface of a second current collector. The positive electrode plate and the negative electrode plate are stacked with a separator interposed therebetween in a state in which the positive electrode active material layer and the negative electrode active material layer face each other (see Japanese Patent Application JP 2013-187021 A). The negative electrode plate includes a facing portion facing the positive electrode active material layer with the separator interposed therebetween and a non-facing portion positioned at the outer periphery of the facing portion and not facing the positive electrode active material layer with the separator interposed therebetween.

The power generation capacity of the battery having the above-described configuration is changed according to the facing area between the positive electrode active material layer and the negative electrode active material layer. If the area of the positive electrode active material layer and the area of the negative electrode active material layer are the same, the facing area between the positive electrode active material layer and the negative electrode active material layer can be changed by a relative positional shift of the positive electrode active material layer and the negative electrode active material layer in a direction intersecting with a stacking direction. Therefore, the negative electrode active material layer has the area larger than the area of the positive electrode active material layer so as to keep the facing area between the positive electrode active material layer and the negative electrode active material layer constant and suppress the change in the power generation capacity even when the positive electrode active material layer and the negative electrode active material layer are relatively misaligned.

SUMMARY

Recently, secondary batteries using silicon as a negative electrode active material have been considered for the purpose of reduction in size and increase in capacity. However, silicon has a large volume change due to charge and discharge. Therefore, when silicon is used for a negative electrode active material, a negative electrode active material layer expands and contracts with the volume change of silicon.

Here, in the case of the above-described secondary battery, a facing portion of a negative electrode plate expands and contracts due to charge and discharge. On the other hand, a non-facing portion of the negative electrode plate has less contribution to charge and discharge than the facing portion, and the expansion and contraction dimension is smaller than that of the facing portion.

As described above, since the expansion and contraction dimension occurring in the negative electrode plate due to the expansion and contraction of the negative electrode active material layer does not become uniform throughout the negative electrode plate, a wrinkle is generated at the outer peripheral edge portion of the negative electrode plate. The wrinkle generated at the outer peripheral edge portion of the negative electrode plate extends toward the facing portion of the negative electrode plate, that is, the portion reacting as the electrode, by repeating charge and discharge. When the wrinkle reaches the portion reacting as the electrode, distances between the electrodes become non-uniform, leading to localization of the reaction, and the performance of the battery deteriorates and the cycle life reduces. Therefore, it is required to suppress the generation of the wrinkle at the outer peripheral edge portion of the negative electrode plate. The above-mentioned problem is not limited to the case in which silicon is used as the negative electrode active material, and may occur as long as the negative electrode active material layer expands and contracts with use.

Therefore, the present invention has been made to solve the above-described problems, and it is an object of the present invention to provide a secondary battery capable of suppressing the generation of wrinkle at an outer peripheral edge portion of a negative electrode plate due to expansion and contract of a negative electrode active material layer with use, and preventing the deterioration in performance and the reduction in cycle life.

To achieve the object, a secondary battery includes a power generating element, wherein a positive electrode plate, in which a positive electrode active material layer is disposed on at least one surface of a first current collector, and a negative electrode plate, in which a negative electrode active material layer having an area larger than an area of the positive electrode active material layer is disposed on at least one surface of a second current collector, are stacked with a separator holding an electrolyte interposed therebetween in a state in which the positive electrode active material layer and the negative electrode active material layer face each other. In the non-aqueous electrolyte secondary battery of the present invention, the negative electrode plate includes a facing portion facing the positive electrode active material layer with the separator interposed therebetween and a non-facing portion positioned at the outer periphery of the facing portion and not facing the positive electrode active material layer with the separator interposed therebetween. The negative electrode plate and the separator are bonded through a bonding layer. In the bonding layer, bonding strength of a second bonding portion that bonds the non-facing portion to the separator is larger than bonding strength of a first bonding portion that bonds the facing portion to the separator.

DETAILED DESCRIPTION

Hereinafter, embodiments of the present invention and modifications thereof will be described with reference to the accompanying drawings. It is noted that, in the description of the drawings, the same elements are denoted by the same reference numerals and a redundant description thereof will be omitted. The size or ratio of each member in the drawings may be exaggerated for convenience of explanation and may be different from the actual size and ratio. It is noted that, in the drawings, X indicates a short side direction of a secondary battery 100, Y indicates a longitudinal direction of the secondary battery 100, and Z indicates a stacking direction of the power generating element 110.

The secondary battery 100 according to the present embodiment will be described with reference to FIGS. 1 to 5. In the present embodiment, a non-aqueous electrolyte secondary battery, more specifically a lithium ion secondary battery, will be described as an example of the secondary battery 100.

Figure 1:
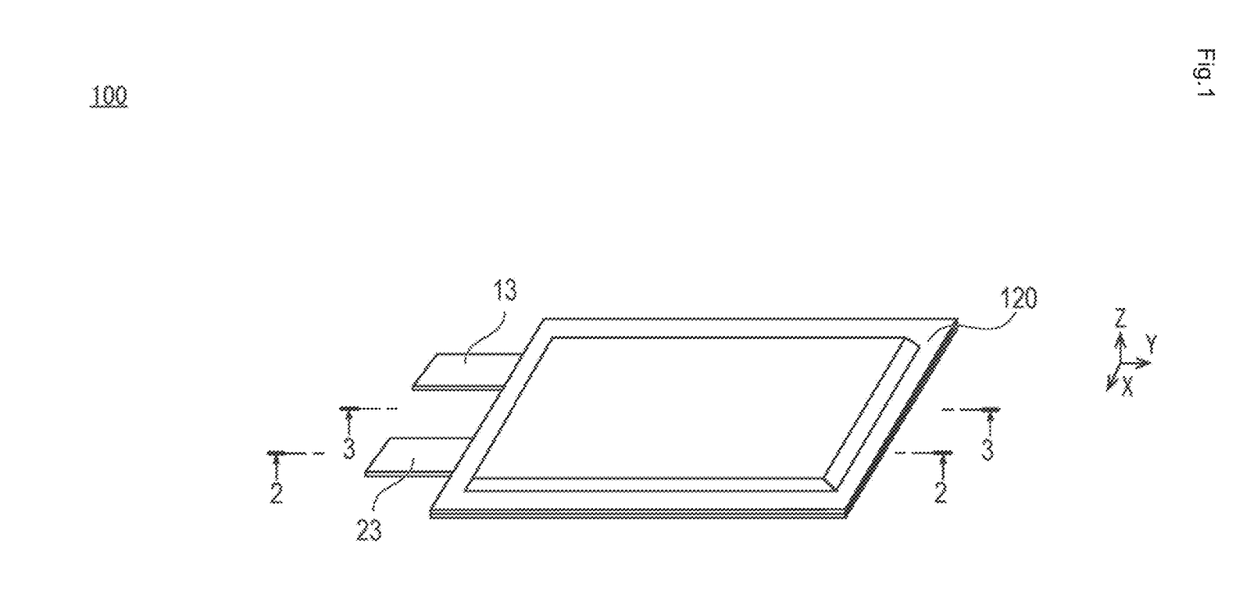
FIG. 1 is a perspective view of a secondary battery according to an embodiment.
Figure 2:
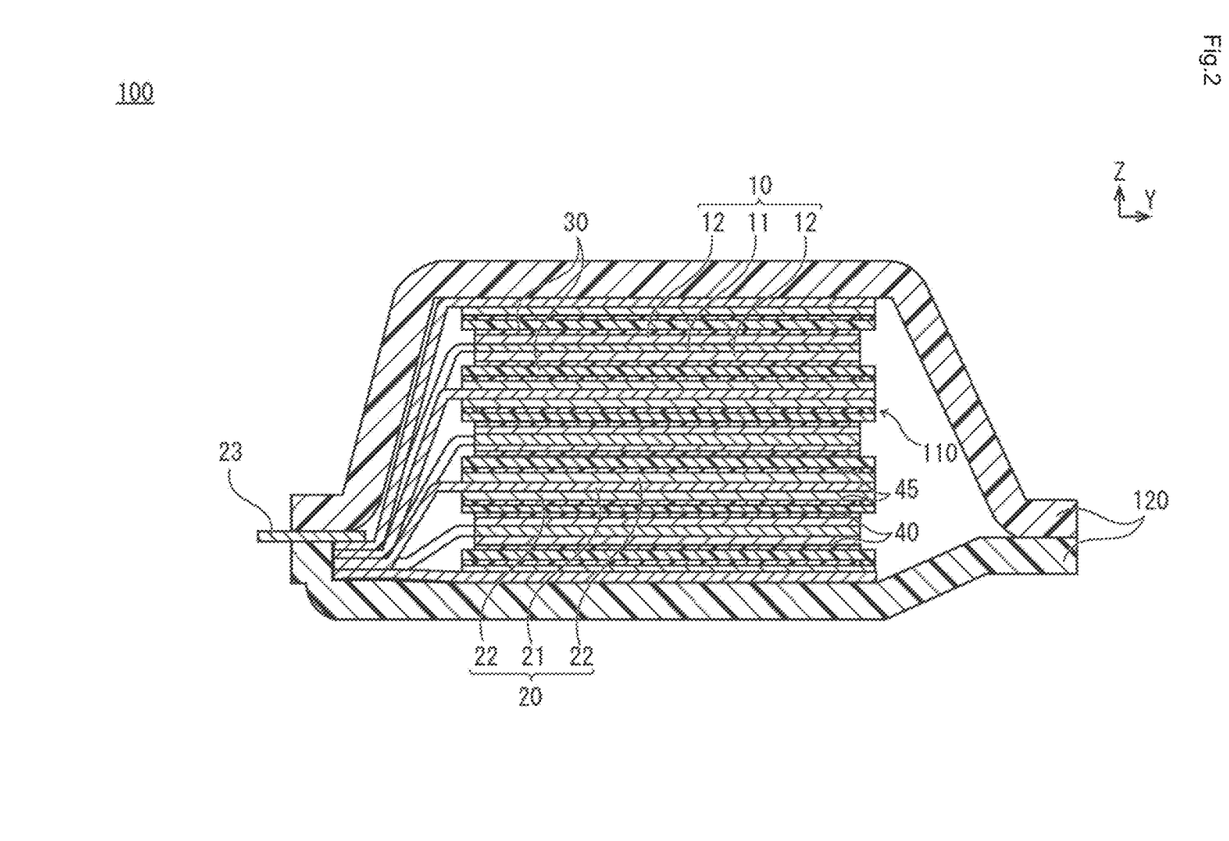
FIG. 2 is a cross-sectional view taken along line 2-2 of FIG. 1.
Figure 3:
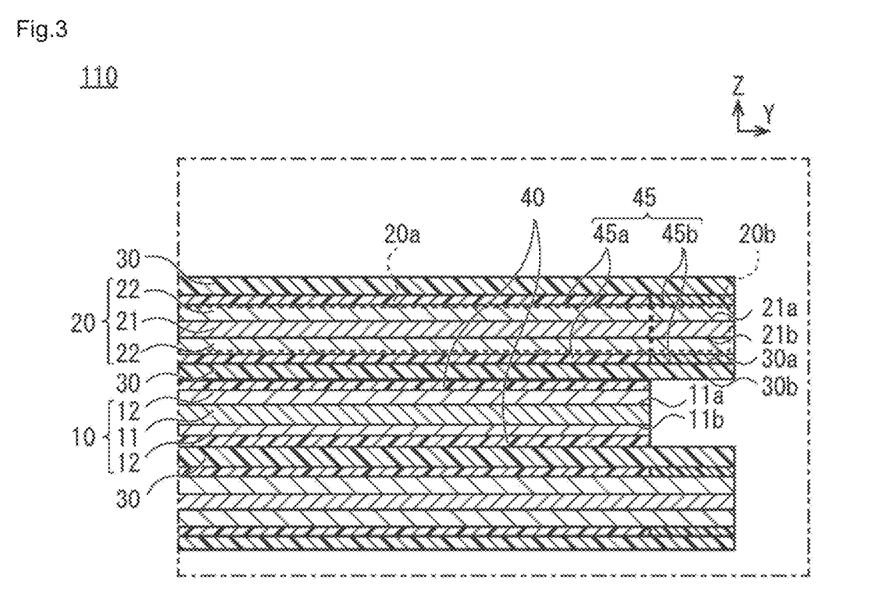
FIG. 3 is a cross-sectional view illustrating a main part of a cross-section taken along line 3-3 of FIG. 1.
Figure 4:
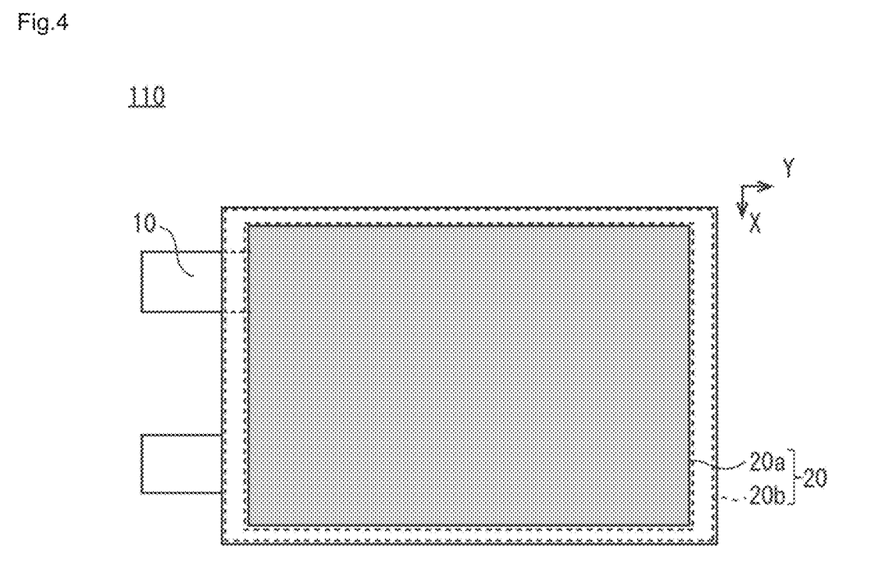
FIG. 4 is a plan view of a power generating element of the secondary battery according to an embodiment.
Figure 5A:
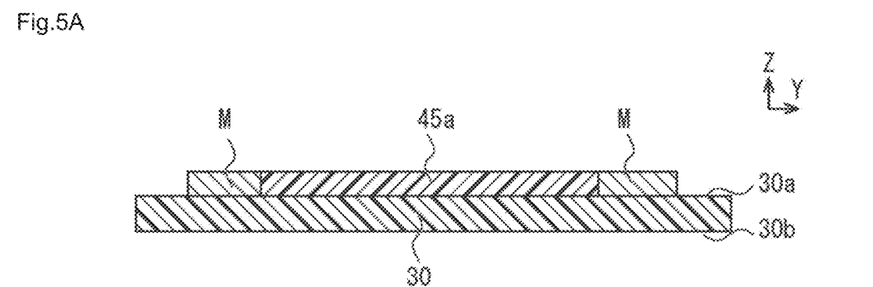
FIG. 5A is a schematic cross-sectional view illustrating a state of forming a first bonding portion.
Figure 5B:
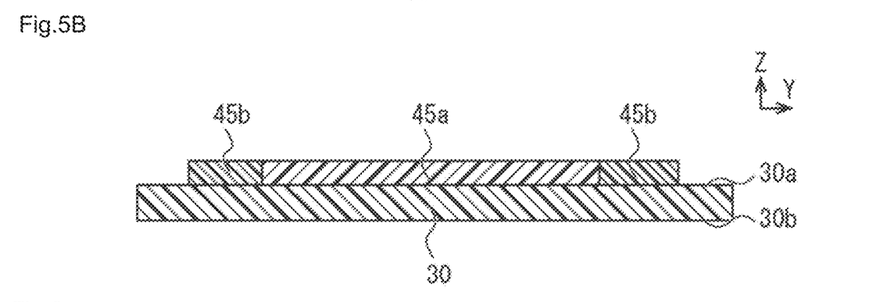
FIG. 5B is a schematic cross-sectional view illustrating a state of forming a second bonding portion.

FIG. 1 is a perspective view of the secondary battery 100 according to the present embodiment. FIG. 2 is a cross-sectional view taken along line 2-2 of FIG. 1. FIG. 3 is a cross-sectional view illustrating a main part of a cross-section taken along line 3-3 of FIG. 1. FIG. 4 is a plan view of the power generating element 110 of the secondary battery 100. FIG. 5A is a schematic cross-sectional view illustrating a state of forming a first bonding portion 45a, and FIG. 5B is a schematic cross-sectional view illustrating a state of forming a second bonding portion 45b.

Referring to FIGS. 1 to 3, in summary, the secondary battery 100 according to the present embodiment includes a power generating element 110. The power generating element 110 is formed by stacking a positive electrode plate 10, in which a positive electrode active material layer 12 is disposed on both surfaces 11a and 11b of a first current collector 11, and a negative electrode plate 20, in which a negative electrode active material layer 22 having an area larger than an area of the positive electrode active material layer 12 is disposed on both surfaces 21a and 21b of a second current collector 21, with a separator 30 holding an electrolyte interposed therebetween in a state in which the positive electrode active material layer 12 and the negative electrode active material layer 22 face each other.

The negative electrode plate 20 includes a facing portion 20a facing the positive electrode active material layer 12 with the separator 30 interposed therebetween and a non-facing portion 20b positioned at the outer periphery of the facing portion 20a and not facing the positive electrode active material layer 12 with the separator 30 interposed therebetween. The negative electrode plate 20 and the separator 30 are bonded through a second bonding layer 45 (corresponding to a bonding layer). In the second bonding layer 45, the bonding strength of a second bonding portion 45b that bonds the non-facing portion 20b to the separator 30 is larger than the bonding strength of a first bonding portion 45a that bonds the facing portion 20a to the separator 30. The secondary battery 100 further includes an exterior member 120 that accommodates the power generating element 110 together with an electrolytic solution. Hereinafter, the secondary battery 100 according to the present embodiment will be described in detail.

<Power Generating Element>

Referring to FIGS. 2 and 3, the power generating element 110 is formed by stacking the positive electrode plate 10 and the negative electrode plate 20 with the separator 30 interposed therebetween in a state in which the positive electrode active material layer 12 and the negative electrode active material layer 22 described later face each other.

The power generating element 110 is accommodated in the exterior member 120 in a state in which the positive electrode plate 10 and the negative electrode plate 20 are stacked with the separator 30 interposed therebetween.

<Electrolytic Solution>

The kind of the electrolytic solution is not particularly limited, and conventionally known solutions can be appropriately used. In the present embodiment, an electrolyte solution using a liquid electrolyte is used as the electrolytic solution, but an electrolytic solution using a gel electrolyte may also be used.

The liquid electrolyte is formed by dissolving a lithium salt as a supporting salt in a solvent. The kind of the solvent is not particularly limited, and for example conventionally known solvents such as dimethyl carbonate (DMC) can be appropriately used.

<Exterior Member>

The exterior member 120 accommodates the power generating element 110 together with the electrolytic solution.

The exterior member 120 is made of a laminated sheet having a three-layer structure. The first layer corresponds to a heat-fusible resin and is formed by using, for example, polyethylene (PE), ionomer, or ethylene vinyl acetate (EVA). The material of the first layer is adjacent to the negative electrode plate 20. The second layer corresponds to a metal foil and is formed by, for example, using Al foil or Ni foil. The third layer corresponds to a resinous film and is formed by using, for example, polyethylene terephthalate (PET) or nylon having rigidity. The material of the third layer is adjacent to the positive electrode plate 10.

<Positive Electrode>

The positive electrode plate 10 is formed by disposing the positive electrode active material layer 12 on both surfaces 11a and 11b of the first current collector 11.

The first current collector 11 has a thin film shape. The material constituting the first current collector 11 is not particularly limited, and can be, for example, aluminum. A positive electrode tab 13 for charge and discharge is connected to the first current collector 11.

The thickness of the first current collector 11 is not particularly limited, but is, for example, about 1 μm to about 100 μm.

The positive electrode active material layer 12 includes a positive electrode active material. The kind of the positive electrode active material is not particularly limited, and can be, for example, $LiNiCoAlO_2$.

In the present embodiment, the positive electrode active material layer 12 is disposed over the entire surfaces of both surfaces 11a and 11b of the first current collector 11. However, the form of the arrangement of the positive electrode active material layer 12 is not particularly limited as long as the positive electrode active material layer 12 and the negative electrode active material layer 22 face each other with the separator 30 interposed therebetween in a state in which the positive electrode plate 10 and the negative electrode plate 20 are stacked through the separator 30.

The thickness of the positive electrode active material layer 12 is not particularly limited, but is, for example, about 1 µm to about 100 µm. A method for controlling the thickness of the positive electrode active material layer 12 is not particularly limited, but a doctor blade method or the like may be used. In addition, as a method for quantitatively determining the thickness of the positive electrode active material layer 12, various methods can be considered, but it can be obtained by, for example, measurement in micrometers or film thickness measurement using radiation.

The method for manufacturing the positive electrode plate 10 is not particularly limited, but, in the present embodiment, a positive electrode slurry is coated on both surfaces 11a and 11b of the first current collector 11 and then dried to form the positive electrode active material layer 12 on both surfaces 11a and 11b of the first current collector 11. The dried positive electrode active material layer 12 is pressed from both sides of the first current collector 11 in a state of being bonded to both surfaces 11a and 11b of the first current collector 11.

The positive electrode slurry contains a positive electrode active material, a conductive assistant, a binder, and a viscosity adjusting solvent. As the positive electrode active material, $LiNiCoAlO_2$ is used at a ratio of 90 wt %. As the conductive assistant, acetylene black is used at a ratio of 5 wt %. As the binder, PVDF is used at a ratio of 5 wt %.

<Negative Electrode>

The negative electrode plate 20 is formed by disposing the negative electrode active material layer 22 on both surfaces 21a and 21b of the second current collector 21.

The second current collector 21 has a thin film shape. The material constituting the second current collector 21 is not particularly limited, and can be, for example, copper. A negative electrode tab 23 for charge and discharge is connected to the second current collector 21.

The thickness of the second current collector 21 is not particularly limited, but is, for example, about 1 µm to about 100 µm.

The area of the negative electrode active material layer 22 is larger than the area of the positive electrode active material layer 12.

Therefore, even when the positions of the positive electrode active material layer 12 and the negative electrode active material layer 22 are relatively shifted, the facing area between the positive electrode active material layer 12 and the negative electrode active material layer 22 can be maintained constant. Therefore, it is possible to suppress the change in the power generation capacity due to the change in the facing area between the positive electrode active material layer 12 and the negative electrode active material layer 22.

The negative electrode active material layer 22 contains a negative electrode active material. At least one kind of the negative electrode active materials is selected from the group consisting of elemental silicon (Si), a silicon alloy, and a silicon oxide.

Silicon has high lithium ion storage capacity per unit volume, as compared with graphite or the like. Therefore, the thickness of the negative electrode active material layer 22 can be reduced by using the above-described material for the negative electrode active material. As a result, it is possible to achieve the reduction in the size of the negative electrode plate 20 and the increase in the capacity of the negative electrode plate 20, which in turn makes it possible to achieve the reduction in the size of the secondary battery 100 and the increase in the capacity of the secondary battery 100.

The thickness of the negative electrode active material layer 22 is not particularly limited, but is, for example, about 1 µm to about 100 µm. A method for controlling the thickness of the negative electrode active material layer 22 is not particularly limited, but a method similar to the method for controlling the thickness of the positive electrode active material layer 12 can be used.

The method for manufacturing the negative electrode plate 20 is not particularly limited, but in the present embodiment, the negative electrode active material layer 22 is formed on both surfaces 21a and 21b of the second current collector 21 by coating a negative electrode slurry on both surfaces 21a and 21b of the second current collector 21 and then drying the negative electrode slurry. The dried negative electrode active material layer 22 is pressed from both sides of the second current collector 21 in a state of being bonded to both surfaces 21a and 21b of the second current collector 21.

The negative electrode slurry can contain, for example, a negative electrode active material, a conduction assistant, a binder, and a viscosity adjusting solvent. As the negative electrode slurry, for example, a mixture of 80 wt % of a silicon alloy as the negative electrode active material, 5 wt % of an acetylene black as the conductive assistant, and 15 wt % of polyimide as the binder can be used. NMP can be used as the solvent for adjusting the viscosity of the slurry.

<Separator>

The separator 30 holds the electrolyte contained in the electrolytic solution.

The kind of the separator 30 is not particularly limited as long as the separator can hold the electrolyte contained in the electrolytic solution, and conventionally known separators can be appropriately used. As the separator 30, for example, it is possible to use a porous sheet separator or a non-woven fabric separator made of a polymer or fiber absorbing and holding the electrolyte contained in the electrolytic solution.

The thickness of the separator 30 is not particularly limited, but is, for example, about 1 µm to about 50 µm.

<Bonding Layer>

The positive electrode plate 10 and the separator 30 are bonded through a first bonding layer 40, and the negative electrode plate 20 and the separator 30 are bonded through a second bonding layer 45.

The first bonding layer 40 is disposed between the positive electrode active material layer 12 and the separator 30 and bonds the positive electrode active material layer 12 and the separator 30 to thereby bond the positive electrode plate 10 and the separator 30. The second bonding layer 45 is disposed between the negative electrode active material layer 22 and the separator 30 and bonds the negative electrode active material layer 22 and the separator 30 to thereby bond the negative electrode plate 20 and the separator 30. The thickness of the first bonding layer 40 is not particularly limited, but is, for example, about 100 nm to about 500 nm. Similarly, the thickness of the second bonding layer 45 is not particularly limited, but is, for example, about 100 nm to about 500 nm.

The material constituting the first bonding layer 40 is not limited as long as the material can bond the positive electrode active material layer 12 and the separator 30. The material constituting the second bonding layer 45 is not limited as long as the material can bond the negative electrode active material layer 22 and the separator 30.

Examples of the material constituting the first bonding layer 40 and the second bonding layer 45 include olefin resins such as polyethylene (PE) and polybutylene (PP), thermoplastic polymers such as polystyrene (PS), polyethylene terephthalate (PET), polyether nitrile (PEN), polyacrylonitrile (PAN), polyimide (PI), polyamide (PA), polyamide imide (PAI), cellulose, carboxymethyl cellulose (CMC), Ethylene-vinyl acetate copolymer, polyvinyl chloride (PVC), styrene butadiene rubber (SBR), isoprene rubber, butadiene rubber, ethylene pyrene rubber, ethylene propylene diene copolymer, styrene butadiene styrene block copolymer and hydrogen additives, and styrene isoprene styrene block copolymer and hydrogen additives, fluorine resins such as polyvinylidene fluoride (PVdF), polyvinylidene fluoride (one having a carboxy group held on part of the side chain), polyvinylidene fluoride hexafluoropropylene (PVdF-HFP), polytetrafluoroethylene (PTFE), tetrafluoroethylene hexafluoropropylene copolymer (FEP), tetrafluoroethylene perfluoroalkyl vinyl ether copolymer (PFA), ethylene tetrafluoroethylene copolymer (ETFE), polychlorotrifluoroethylene copolymer (PCTFE), ethylene chlorotrifluoroethylene (ECTFE), and poly vinyl fluoride (PVF), vinylidene fluoride based fluororubbers such as vinylidene fluoride hexafluoropropylene based fluororubber (VDF-HFP based fluororubber), vinylidene fluoride hexafluoropropylene tetrafluoroethylene based fluororubber (VDF-HFP-TFE based fluororubber), vinylidene fluoride pentafluoropropylene based fluororubber (VDF-PFP based fluororubber), vinylidene fluoride pentafluoropropylene tetrafluoroethylene based fluororubber (VDF-PFP-TFE based fluororubber), vinylidene fluoride perfluoromethyl vinyl ether tetrafluoroethylene based fluororubber (VDF-PFMVE-TFE based fluororubber), and vinylidene fluoride chlorotrifluoroethylene based fluororubber (VDF-CTFE based rubber), (meth)acrylic resins such as epoxy resin, polymethylene acrylate (PMA), and polymethyl methacrylate (PMMA), aramid, polyvinyl dichloride (PVDC).

Examples of the material constituting the first bonding layer 40 and the second bonding layer 45 preferably include polyvinylidene fluoride, polyimide, styrene butadiene rubber, carboxy methyl cellulose, polypropylene, polytetrafluoroethylene, polyacrylonitrile, and polyamide.

The above-described materials as the material constituting the first bonding layer 40 and the material constituting the second bonding layer 45 are excellent in heat resistance and further stable in both oxidation potential and reduction potential.

For example, polyvinylidene chloride (PVdF), (meth) acrylic resin, olefin resin, or the like among the above-described materials as the material constituting the first bonding layer 40 and the material constituting the second bonding layer 45 is strong against the potential on the oxidation side or the reduction side, and thus it can be preferably used for the first bonding layer 40 or the second bonding layer 45.

PTFE or the like among the above-described materials as the material constituting the first bonding layer 40 and the material constituting the second bonding layer 45 is strong against the oxidation potential, and thus it is preferably used as the material constituting the first bonding layer 40 that bonds the positive electrode active material layer 12 and the separator 30.

On the other hand, SBR or the like among the above-described materials as the material constituting the first bonding layer 40 and the material constituting the second bonding layer 45 is strong against the reduction potential, and thus it is preferably used as the material constituting the second bonding layer 45 that bonds the negative electrode active material layer 22 and the separator 30.

The above-described materials as the material constituting the first bonding layer 40 and the material constituting the second bonding layer 45 may be used singly or in combination of two or more kinds.

The first bonding layer 40 is disposed in a portion facing the positive electrode active material layer 12 on a surface 30a of the separator 30 facing the positive electrode active material layer 12. However, the form of the arrangement of the first bonding layer 40 is not particularly limited as long as it can bond the positive electrode active material layer 12 and the separator 30. For example, the first bonding layer 40 may be disposed on the entire surface of the surface 30a of the separator 30 facing the positive electrode active material layer 12.

Similarly, the second bonding layer 45 is disposed in a portion facing the negative electrode active material layer 22 on a surface 30b of the separator 30 facing the negative electrode active material layer 22. However, the form of the arrangement of the second bonding layer 45 is not particularly limited as long as it can bond the negative electrode active material layer 22 and the separator 30. For example, the second bonding layer 45 may be disposed on the entire surface of the surface 30b of the separator 30 facing the negative electrode active material layer 22.

<Relationship Between Second Bonding Layer and Negative Electrode Plate>

Referring to FIGS. 3 and 4, the negative electrode plate 20 includes a facing portion 20a facing the positive electrode active material layer 12 with the separator 30 interposed therebetween and a non-facing portion 20b positioned a the outer periphery of the facing portion 20a and not facing the positive electrode active material layer 12 with the separator 30 interposed therebetween.

The second bonding layer 45 includes a first bonding portion 45a that bonds the facing portion 20a to the separator 30 and a second bonding portion 45b that bonds the non-facing portion 20b to the separator 30. The first bonding portion 45a is arranged between the separator 30 and the facing portion 20a. The second bonding portion 45b is arranged between the separator 30 and the non-facing portion 20b.

The bonding strength of the second bonding portion 45b is larger than the bonding strength of the first bonding portion 45a. The method for evaluating the bonding strength is not particularly limited as long as the evaluation of the bonding strength of the first bonding portion 45a and the bonding strength of the second bonding portion 45b is performed by the same evaluation method. As the method for evaluating the bonding strength, for example, a method described in JIS K6854-1 (90 degree peel test) or K6854-2 (180 degree peel test) can be used.

The negative electrode active material layer 22 expands and contracts with use. Specifically, as described above, at least one kind of the negative electrode active materials contains silicon, but silicon has a large volume change according to charge and discharge. Therefore, when the material containing silicon is used as the negative electrode active material, the negative electrode active material layer 22 expands and contracts as the volume of silicon changes. Specifically, the negative electrode active material layer 22 expands during charge and contracts during discharge.

When the negative electrode active material layer 22 expands and contracts, the negative electrode plate 20 expands and contracts, but the expansion and contraction dimension (magnitude of expansion and contraction) does not become uniform throughout the negative electrode plate 20. Specifically, referring to FIGS. 2 and 3, the facing portion 20a of the negative electrode plate 20 expands and contracts as ions are exchanged with the positive electrode plate 10 due to charge and discharge. On the other hand, the non-facing portion 20b of the negative electrode plate 20 has less ion exchange with the positive electrode plate 10 and less contributes to charge and discharge. Therefore, the expansion and contraction dimension of the non-facing portion 20b is smaller than that of the facing portion 20a.

Here, the expansion of the negative electrode active material layer 22 in the non-facing portion 20b of the negative electrode plate 20 during charge is smaller than the expansion of the negative electrode active material layer 22 in the facing portion 20a. However, the tensile force according to the extension of the facing portion 20a is applied to the negative electrode plate 20 in the non-facing portion 20b, and thus the second current collector 21 is stretched and expanded. When discharge is performed from this state, the negative electrode active material layer 22 contracts and reduces in the negative electrode plate 20 in the facing portion 20a, but the negative electrode plate 20 in the non-facing portion 20b has little contraction of the negative electrode active material layer 22 and hardly reduces.

As described above, when the facing portion 20a expands and contracts, a difference is generated in the size of the expansion and contraction dimension between the facing portion 20a and the non-facing portion 20b, and wrinkle is generated by the change in the tensile force of the non-facing portion 20b which is caused by the difference in the expansion and contraction dimension.

In the secondary battery 100 according to the present embodiment, since the bonding strength of the second bonding portion 45b is larger than the bonding strength of the first bonding portion 45a, expansion and contraction of the non-facing portion 20b can be suppressed more than the facing portion 20a, and the expansion and contraction dimension of the non-facing portion 20b can be reduced. Therefore, it is possible to suppress the change in the tensile force of the non-facing portion 20b due to the difference in the expansion and contraction dimension between the facing portion 20a and the non-facing portion 20b. Therefore, it is possible to suppress the generation of wrinkle at the outer peripheral edge portion of the negative electrode plate 20 due to the expansion and contraction of the negative electrode active material layer 22.

The bonding strength of the second bonding portion 45b is not particularly limited as long as it is larger than the bonding strength of the first bonding portion 45a, but for example, the ratio of the bonding strength of the first bonding portion 45a to the bonding strength of the second bonding portion 45b is 0.02<(the bonding strength of the first bonding portion 45a/the bonding strength of the second bonding portion 45b)<0.5. In other words, the ratio of the bonding strength of the first bonding portion 45a: the bonding strength of the second bonding portion 45b can be set within the range of 1:2 to 1:50.

In the present embodiment, an average particle diameter of the material constituting the second bonding portion 45b is larger than an average particle diameter of the material constituting the first bonding portion 45a. The average particle diameter means an average particle diameter of a material which generates a bonding force among the materials constituting the second bonding layer 45. For example, when polyvinylidene fluoride (PVdF) is used as the material constituting the second bonding layer 45, the average particle diameter means an average particle diameter of polyvinylidene fluoride (PVdF). In addition, when two or more kinds of materials are used as the material constituting the second bonding layer 45, the average particle diameter means an average particle diameter of all these materials.

Since the bonding strength increases when the average particle diameter of the material which generates the bonding force among the materials constituting the second bonding layer 45 is made small, the bonding strength of the second bonding portion 45b can be made larger than the bonding strength of the first bonding portion 45a by a simple method for making the average particle diameter different.

The average particle diameter of the material constituting the first bonding portion 45a and the average particle diameter of the material constituting the second bonding portion 45b are not particularly limited as long as the bonding strength of the second bonding portion 45b is larger than the bonding strength of the first bonding portion 45a. For example, in the case of using polyvinylidene fluoride (PVdF) as the material constituting the second bonding layer 45, the average particle diameter of the material constituting the first bonding portion 45a can be set to 1 µm and the average particle diameter of the material constituting the first bonding portion 45a can be set to 0.1 µm.

The method for calculating the average particle size of the material constituting the first bonding portion 45a and the average particle diameter of the material constituting the second bonding portion 45b is not limited as long as the method for calculating the average particle diameter of the material constituting the first bonding portion 45a is the same as the method for calculating the average particle diameter of the material constituting the second bonding portion 45b. As the average particle diameter of the material constituting the first bonding portion 45a and the average particle diameter of the material constituting the second bonding portion 45b, for example, it is possible to use the 50% cumulative particle diameter from the small particle diameter side by a laser diffraction and scattering method.

The method for forming the first bonding portion 45a and the second bonding portion 45b is not particularly limited, but the first bonding portion 45a and the second bonding portion 45b can be formed by, for example, the following procedure.

Referring to FIG. 5A, of the portions of the surface 30b of the separator 30 facing the negative electrode active material layer 22, a release paper M having the same thickness as that of the first bonding portion 45a is disposed at a portion not facing the negative electrode active material layer 22 when the positive electrode plate 10 and the negative electrode plate 20 are stacked through the separator 30. Then, the material constituting the first bonding portion 45a is coated toward the surface 30b. Therefore, the first bonding portion 45a is formed on the surface 30b.

Next, the release paper M is peeled off and the material constituting the second bonding portion 45b is coated to the portion not facing the negative electrode active material layer 22 when the positive electrode plate 10 and the negative electrode plate 20 are stacked through the separator 30. Therefore, as illustrated in FIG. 5B, the second bonding portion 45b is formed on the surface 30b.

<Operation of Secondary Battery>

The secondary battery 100 according to the present embodiment is repeatedly charged and discharged as a driving power source or an auxiliary power source for motors of vehicles such as fuel cell vehicles and hybrid electric vehicles. Due to the charge and discharge, the volume of the negative electrode active material contained in the negative electrode active material layer 22 changes, and the negative electrode active material layer 22 expands and contracts.

In the secondary battery 100 according to the present embodiment, the bonding strength of the second bonding portion 45b that bonds the non-facing portion 20b of the negative electrode plate 20 to the separator 30 is larger than the bonding strength of the first bonding portion 45a that bonds the facing portion 20a to the separator 30. Therefore, the expansion and contraction of the non-facing portion 20b can be suppressed more than the facing portion 20a, and the expansion and contraction dimension of the non-facing portion 20b can be reduced. Therefore, it is possible to suppress the change in the tensile force of the non-facing portion 20b due to the difference in the expansion and contraction dimension between the facing portion 20a and the non-facing portion 20b. Therefore, it is possible to suppress the generation of wrinkle at the outer peripheral edge portion of the negative electrode plate 20 due to the expansion and contraction of the negative electrode active material layer 22.

By suppressing the generation of the wrinkle at the outer peripheral edge portion of the negative electrode plate 20, it is possible to suppress the generation of wrinkle at the facing portion 20a, that is, the portion reacting as the electrode. Therefore, it is possible to suppress the localization of reaction (non-uniformity of current density or the like) caused by non-uniformity of the inter-electrode distance due to the generation of the wrinkle of the portion reacting as the electrode, and it is possible to prevent the deterioration in the performance of the battery and the reduction in the cycle life.

<Operation and Effect>

The secondary battery 100 according to the present embodiment includes the power generating element 110. The power generating element 110 is formed by stacking the positive electrode plate 10 and the negative electrode plate 20 in a state in which the positive electrode active material layer 12 and the negative electrode active material layer 22 face each other with the separator 30 holding the electrolyte interposed therebetween. The positive electrode plate 10 is formed by disposing the positive electrode active material layer 12 on both surfaces 11a and 11b of the first current collector 11. The negative electrode plate 20 is formed by disposing the negative electrode active material layer 22 on both surfaces 21a and 21b of the second current collector 21 such that the area of the negative electrode active material layer 22 is larger than the area of the positive electrode active material layer 12. The negative electrode plate 20 includes the facing portion 20a facing the positive electrode active material layer 12 with the separator 30 interposed therebetween and the non-facing portion 20b positioned at the outer periphery of the facing portion 20a and not facing the positive electrode active material layer 12 with the separator 30 interposed therebetween. The negative electrode plate 20 and the separator 30 are bonded through the second bonding layer 45. In the second bonding layer 45, the bonding strength of the second bonding portion 45b that bonds the non-facing portion 20b to the separator 30 is larger than the bonding strength of the first bonding portion 45a that bonds the facing portion 20a to the separator 30.

In the secondary battery 100 according to the present embodiment, the bonding strength of the second bonding portion 45b that bonds the non-facing portion 20b of the negative electrode plate 20 and the separator 30 is larger than the bonding strength of the first bonding portion 45a that bonds the facing portion 20a of the negative electrode plate 20 and the separator 30. Therefore, the expansion and contraction of the non-facing portion 20b can be suppressed more than the facing portion 20a, and the expansion and contraction dimension of the non-facing portion 20b can be reduced. Therefore, it is possible to suppress the change in the tensile force of the non-facing portion 20b due to the difference in the expansion and contraction dimension between the facing portion 20a and the non-facing portion 20b. Therefore, it is possible to suppress the generation of wrinkle at the outer peripheral edge portion of the negative electrode plate 20 due to the expansion and contraction of the negative electrode active material layer 22. Therefore, it is possible to provide the secondary battery capable of preventing the deterioration in performance and the reduction in cycle life.

In addition, in the secondary battery 100 according to the present embodiment, the average particle diameter of the material constituting the second bonding portion 45b is larger than the average particle diameter of the material constituting the first bonding portion 45a.

In the secondary battery 100 according to the present embodiment, the bonding strength of the second bonding portion 45b can be made higher than the bonding strength of the first bonding portion 45a by a simple method for making the average particle diameters different. Therefore, the secondary battery can be easily manufactured.

In addition, the secondary battery 100 according to the present embodiment is a lithium ion secondary battery, and at least one kind of the negative electrode active materials contained in the negative electrode active material layer 22 is selected from the group consisting of silicon, a silicon alloy, and a silicon oxide.

In the secondary battery 100 according to the present embodiment, since the negative electrode active material layer 22 can be made thin, it is possible to achieve the size reduction in the negative electrode plate 20 and the increase in capacity. Therefore, it is possible to realize the size reduction of the secondary battery 100 and the increase in the capacity of the secondary battery 100.

(Modification 1)

In the above-described embodiment, the bonding strength of the second bonding portion 45b was made larger than the bonding strength of the first bonding portion 45a by making the average particle diameter of the material constituting the second bonding portion 45b smaller than the material constituting the first bonding portion 45a. However, the method for making the bonding strength of the second bonding portion 45b larger than the bonding strength of the second bonding portion 45b is not particularly limited.

For example, the basis weight of the material constituting the second bonding portion 45b may be larger than the basis weight of the material constituting the first bonding portion 45a. Here, in the present specification, the "basis weight" means the mass per unit area of the second bonding layer 45 of the material that generates the bonding force among the materials constituting the second bonding layer 45.

The bonding strength of the second bonding layer 45 increases as the basis weight increases. That is, in the secondary battery according to the present modification, the bonding strength of the second bonding portion 45b can be made larger than the bonding strength of the first bonding portion 45a by a simple method for making the basis weights different. Therefore, the secondary battery 100 can be easily manufactured.

The basis weight of the material constituting the second bonding portion 45b is not particularly limited as long as it is larger than the basis weight of the material constituting the first bonding portion 45a. For example, in the case of using polyvinylidene fluoride (PVdF) as the material constituting the second bonding layer 45, the basis weight of the first bonding portion 45a can be set to 5 mg/cm$^2$, and the basis weight of the second bonding portion 45b can be set to 20 mg/cm$^2$.

The method for making the basis weight of the first bonding portion 45a different from the basis weight of the second bonding portion 45b is not particularly limited, but for example, when the material constituting the second bonding layer 45 is coated to the surface 30a of the separator 30 facing the negative electrode active material layer 22, the basis weight per unit area can be made different by adjusting the time for coating the material. That is, the basis weights can be made different by making the time for coating the material constituting the first bonding portion 45a different from the time for coating the material constituting the second bonding portion 45b. As the coating time increases, the basis weight becomes larger.

In the secondary battery according to the present modification, the bonding strength of the second bonding portion 45b can be made higher than the bonding strength of the first bonding portion 45a by a simple method for making the basis weights different. Therefore, the secondary battery can be easily manufactured.

(Modification 2)

In addition, the second bonding portion 45b may have non-ionic permeability.

Therefore, since the negative electrode active material layer 22 of the non-facing portion 20b of the negative electrode plate 20 is covered with a member having non-ionic permeability, it is possible to prevent the electrolytic solution from being consumed due to the contact between the electrolytic solution and the negative electrode active material layer 22 of the non-facing portion 20b which does not function as the electrode. Therefore, since the electrolytic solution can be effectively used, the amount of the electrolyte to be charged in the secondary battery 100 can be reduced. Therefore, the size of the secondary battery 100 can be further reduced, and the manufacturing cost can be reduced.

The method for providing the second bonding portion 45b with non-ionic permeability is not particularly limited, but for example, the second bonding portion 45b can be provided with non-ionic permeability by reducing the porosity of the second bonding portion 45b. The porosity can be adjusted by changing the drying condition (drying temperature, drying time, or the like) after coating the separator 30 with a dispersion solution such as polyvinylidene fluoride (PVdF). As the drying time is longer and the drying temperature is higher, the porosity becomes smaller.

(Modification 3)

In addition, in the above-described embodiment, modification 1, and modification 2, the material constituting the first bonding portion 45a and the material constituting the second bonding portion 45b were identical to each other. However, the material constituting the first bonding portion 45a and the material constituting the second bonding portion 45b may be different from each other.

Therefore, the bonding strength of the second bonding portion 45b can be made larger than the bonding strength of the first bonding portion 45a by a simple method for making the materials different. Therefore, the secondary battery can be easily manufactured.

The combination of the material constituting the first bonding portion 45a and the material constituting the second bonding portion 45b is not particularly limited as long as the bonding strength of the second bonding portion 45b is larger than the bonding strength of the first bonding portion 45a. For example, a polyvinylidene fluoride (PVdF) dispersion solution can be used as the material constituting the first bonding portion 45a, and a material in which ceramic particles and an acrylic binder are dispersed in N-methyl-2-pyrrolidone (NMP) can be used as the material constituting the second bonding portion 45b.

(Other Modifications)

Furthermore, in the above-described embodiments and modifications, a so-called non-hyperbolic secondary battery in which the positive electrode active material layer 12 was disposed on both surfaces 11a and 11b of the first current collector 11 and the negative electrode active material layer 22 was disposed on both surfaces 21a and 21b of the second current collector 21 was described as an example.

Figure 6:
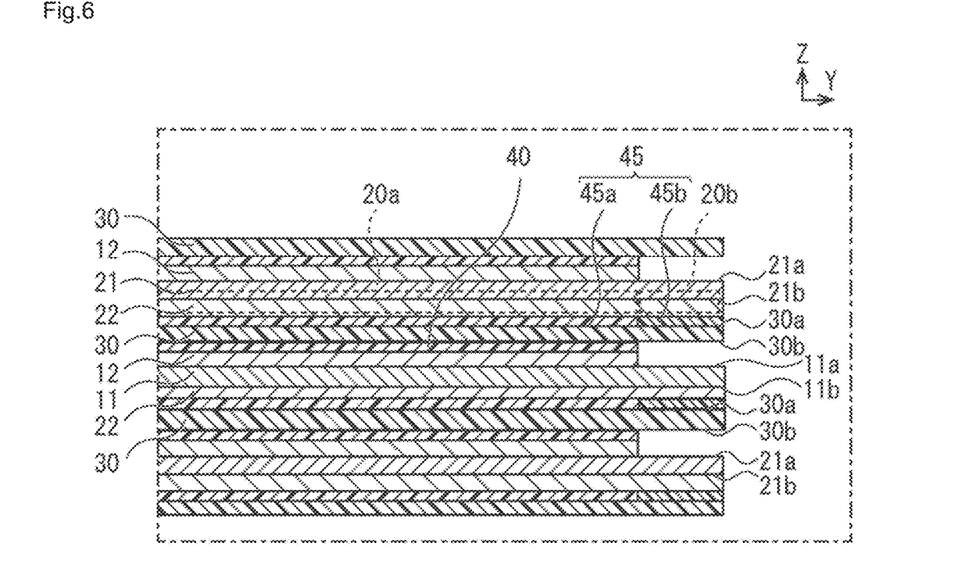
FIG. 6 is a cross-sectional view corresponding to FIG. 3, illustrating a main part of a secondary battery according to another modification of an embodiment.

However, as illustrated in FIG. 6, the present invention can also be applied to a so-called hyperbolic secondary battery in which the positive electrode active material layer 12 was disposed on one surface 11a (21a) of the first current collector 11 (second current collector 21) and the negative electrode active material layer 22 was disposed on the other surface 11b(21b) facing the one surface 11a(21a).

In the present modification, the first current collector 11 and the second current collector 21 may have the same structure. The material constituting the first current collector 11 and the material constituting the second current collector 21 are not particularly limited, and conventionally known materials can be used. The material constituting the first current collector 11 and the material constituting the second current collector 21 may be, for example, an aluminum foil, a stainless steel (SUS) foil, a clad material of nickel and aluminum, a clad material of copper and aluminum, a clad material of SUS and aluminum, or a combination of these metals. Alternatively, a current collector in which aluminum is coated on a metal surface may be used. Furthermore, a so-called composite current collector in which two or more metal foils are laminated may be used.

The secondary battery according to the present modifications can also achieve the same effect as the above-described embodiments. In addition, the configuration described in the modification of the above-described embodiment can be applied to the secondary battery according to the present modification, and therefore, it is possible to achieve the same effect as the secondary battery according to the modification of the above-described embodiment.

Although the secondary battery has been described through the embodiment and modification thereof, the present invention is not limited only to the configurations described in the embodiment and modification thereof, but may be appropriately modified based on the description of the claims.

For example, the present invention can be applied regardless of the kind of the secondary battery, the kind of the active material, the kind of the electrolyte, or the like as long as the secondary battery has the negative electrode active material layer that expands and contracts with use.

In addition, in the above-described embodiment and modification thereof, the secondary battery 100 of a type in which the positive electrode tab 13 and the negative electrode tab 23 are taken out from one side of the secondary battery 100 has been described as an example. However, the present invention can also be applied to a secondary battery of a type in which the positive electrode tab is taken out from one side of the secondary battery and the negative electrode tab is taken out from the other side.

Furthermore, in the above-described embodiment and modification thereof, the stacking type secondary battery has been described as an example, but the present invention can also be applied to a winding type secondary battery.

The present application is based on Japanese Patent Application 2016-191862 which has been filed on Sep. 29, 2016, and the disclosures of which are incorporated herein by reference in their entirety.

REFERENCE SIGNS LIST

10 Positive electrode plate
11 First current collector
11a, 21a Surface (one surface)
11b, 21b Surface
12 Positive electrode active material layer
20 Negative electrode plate
20a Facing portion
20b Non-facing portion
21 Second current collector
22 Negative electrode active material layer
30 Separator
40 First bonding layer
45 Second bonding layer (bonding layer)
45a First bonding portion
45b Second bonding portion
100 Secondary battery
110 Power generating element
120 Exterior member
M Release paper

The invention claimed is:

1. A secondary battery comprising a power generating element, wherein a positive electrode plate, in which a positive electrode active material layer is disposed on at least one surface of a first current collector, and a negative electrode plate, in which a negative electrode active material layer having an area larger than an area of the positive electrode active material layer is disposed on at least one surface of a second current collector, are stacked with a separator holding an electrolyte interposed therebetween in a state in which the positive electrode active material layer and the negative electrode active material layer face each other, the negative electrode plate comprises a facing portion facing the positive electrode active material layer with the separator interposed therebetween and a non-facing portion positioned at the outer periphery of the facing portion and not facing the positive electrode active material layer with the separator interposed therebetween, the negative electrode plate and the separator are bonded through a bonding layer, and in the bonding layer, bonding strength of a second bonding portion that bonds the non-facing portion to the separator is larger than bonding strength of a first bonding portion that bonds the facing portion to the separator.

2. The secondary battery according to claim 1, wherein an average particle diameter of a material constituting the second bonding portion is smaller than an average particle diameter of a material constituting the first bonding portion.

3. The secondary battery according to claim 1, wherein a basis weight of a material constituting the second bonding portion is larger than a basis weight of a material constituting the first bonding portion.

4. The secondary battery according to claim 1, wherein a material constituting the first bonding portion and a material constituting the second bonding portion are different from each other.

5. The secondary battery according to claim 4, wherein the second bonding portion has non-ionic permeability.

6. The secondary battery according to claim 1, wherein the secondary battery is a lithium ion secondary battery, and at least one kind of negative electrode active materials contained in the negative electrode active material layer is selected from a group consisting of silicon, a silicon alloy, and a silicon oxide.

* * * * *